United States Patent [19]

Mahler

[11] Patent Number: 4,809,655
[45] Date of Patent: Mar. 7, 1989

[54] METHOD FOR THE DIRECT INJECTION OF FUEL INTO THE COMBUSTION CHAMBER IN THE CYLINDER HEAD OF A DIESEL ENGINE AND DEVICE FOR IMPLEMENTING SUCH METHOD

[76] Inventor: Willy Mahler, Muristrasse 4, CH-Obfelden 8912, Switzerland

[21] Appl. No.: 827,927
[22] PCT Filed: Apr. 25, 1984
[86] PCT No.: PCT/CH84/00062
    § 371 Date: Feb. 25, 1987
    § 102(e) Date: Feb. 25, 1987
[87] PCT Pub. No.: WO85/04927
    PCT Pub. Date: Nov. 7, 1985
[51] Int. Cl.⁴ .......................... F02M 57/04
[52] U.S. Cl. ................................. 123/296
[58] Field of Search .............. 123/296, 188 AF

[56] References Cited

U.S. PATENT DOCUMENTS

| | | |
|---|---|---|
| 1,201,533 | 10/1916 | Wakenhuth ............... 123/296 X |
| 2,044,522 | 6/1936 | Wurtele ...................... 123/296 |
| 2,071,719 | 2/1937 | Wurtele ...................... 123/296 |
| 2,072,437 | 3/1937 | Wurtele .................... 123/296 X |
| 2,280,386 | 4/1942 | Dickson . | 
| 3,812,829 | 5/1974 | McCormick ............... 123/296 |

FOREIGN PATENT DOCUMENTS

| | | |
|---|---|---|
| 2913763 | 10/1980 | Fed. Rep. of Germany . |
| 1554337 | 1/1969 | France . |
| 2050287 | 4/1971 | France . |
| 2355994 | 1/1978 | France . |
| 735834 | 8/1955 | United Kingdom . |
| 748589 | 5/1956 | United Kingdom ......... 123/296 |
| 2016594 | 9/1979 | United Kingdom . |

Primary Examiner—Tony M. Argenbright
Attorney, Agent, or Firm—Cushman, Darby & Cushman

[57] ABSTRACT

The inlet valve (1) and the injection nozzle (8) for a diesel engine with direct injection are combined together in such a way that they form a single unit. The fuel is atomized for direct injection in the middle of the combustion space in the cylinder head.

3 Claims, 1 Drawing Sheet

U.S. Patent    Mar. 7, 1989    4,809,655
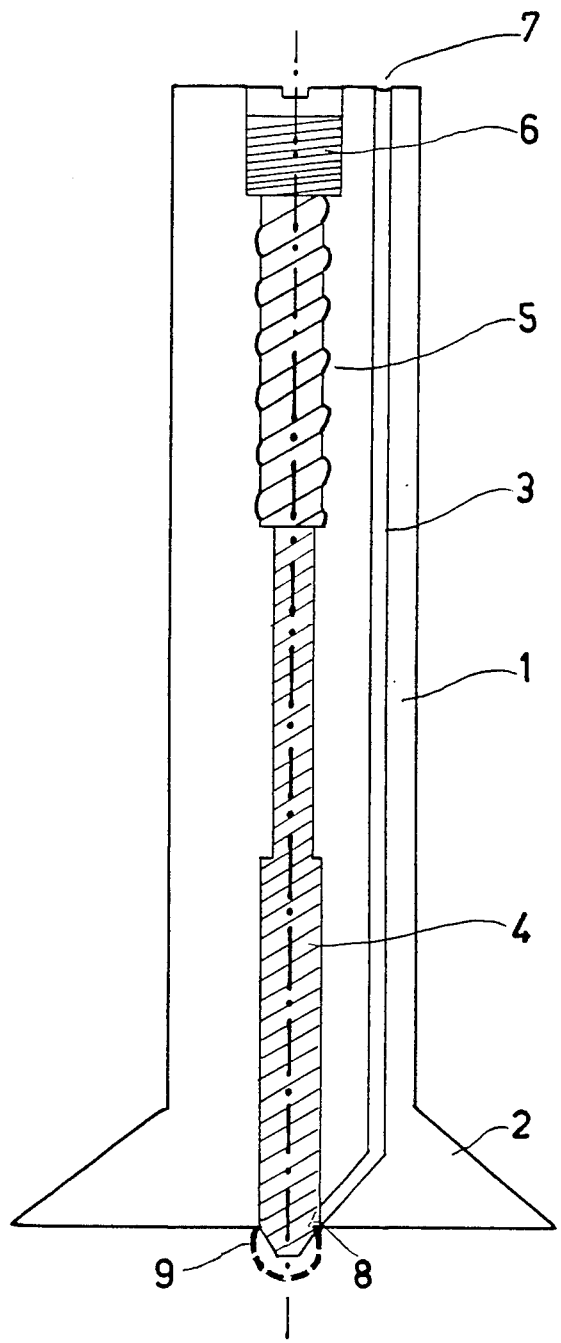

METHOD FOR THE DIRECT INJECTION OF FUEL INTO THE COMBUSTION CHAMBER IN THE CYLINDER HEAD OF A DIESEL ENGINE AND DEVICE FOR IMPLEMENTING SUCH METHOD

BACKGROUND OF THE INVENTION

The invention relates to a method for the direct injection of fuel and a device for implementing the method.

In the general state of the art, the fuel valve consists of a partly open and partly closed nozzle cut off from the combustion chamber by a needle to prevent dribbling. The injection nozzle and the inlet valve are separate and are also fitted individually and separately from each other. As the valves are usually fitted vertically to the cylinder, the injection nozzle must necessarily be arranged between the inlet and exhaust valves. It is known that the combustion chamber in the piston must therefore be specially shaped to ensure the proper atomisation of the fuel. It is known that a method of doing this is to make the piston head in the shape of a heart or pan in order to give the air in the combustion chamber a spin with the aid of air guides so as to improve the atomisation of the fuel.

The purposes of the inlet valve and the atomisation nozzle are different. Whereas the valves are designed to let the fuel-air mixture in or the exhaust gases out, the atomisation nozzles are designed to admit the fuel into the combustion chamber and atomise it. The better the atomisation of the fuel in the combustion chamber, the better the combustion.

French patent specification No. 2,050,287 describes a fuel injection pump for a four-stroke engine in which the injection pressure may be obtained simply by pressing down the inlet valve in which the injection valve is centrally arranged. This arrangement cannot be transferred to the diesel engine because, in this method, the injection pressure is determined by the spring-loaded, chamberless injection valve. The stronger the pressure spring on the injection needle, the greater the spray pressure and the greater the pressure rise in the injection pump fitted outside the cylinder. FIG. 1 of the French patent specification is typical of four-stroke engines and can by no manner of means be transferred to diesel engines, since in the diesel engine the fuel must be sprayed in with the valve closed and not with it open as shown in FIG. 1 of the French patent specification.

French patent specification No. 1,554,337 describes a fuel injection device for a two-stroke engine in which the valve and injector are mutually separate and where there is no method of direct injection. In contradistinction, in the present invention the valve and the injector form an integral unit in which the valve is positively and stroke-controlled and a feature is that the fuel is directly injected.

U.S. Pat. No. 2,280,386 describes a combined cylinder with a poppet valve and a fuel injector, in which the fuel is not directly injected but must first be taken into an annular chamber and where the inlet valve and the injector do not form an inseparable unit. This publication contrasts with the present invention, according to which the valve and the injector form an inseparable unit giving direct fuel injection.

SUMMARY OF THE INVENTION

It has amazingly been found that, if the inlet valve is used with the injection nozzle as a combined unit, the fuel is atomisd in an ideal fashion in the cylinder head combustion chamber, and the best possible combustion is also possible since it is possible to fit the atomisation nozzle centrally and vertically to the combustion chamber and therefore the fuel is atomised in the centre of the combustion space.

The present invention relates to a method of directly injecting fuel into the combustion chamber of the cylinder head of a diesel engine and a device for implementing the method by arranging the atomisation nozzle in such a way that the fuel is atomised for direct injection in the middle of the combustion chamber in the cylinder head, in which the atomisation nozzle is incorporated into the inlet valve in such a way as to form a single unit.

The purpose of this invention is to produce a single component by a novel combination of inlet valve and injection nozzle, permitting its central installation above the combustion chamber, so that the fuel is atomised in the centre of the cylinder head combustion space.

The invention will now be explained in greater detail with reference to a drawing.

BRIEF DESCRIPTION OF THE DRAWING

The drawing shows a longitudinal section through an inlet valve combined with an injection nozzle in the closed position, on an enlarged scale.

DETAILED DESCRIPTION 1 is the inlet valve with poppet valve 2. There is an internal passageway or bore for the fuel supply 3 in inlet valve body 1 and another for nozzle needle 4. At the top, nozzle needle 4 abuts against pressure spring 5, which can be tensioned to a greater or lesser extent by means of a screw 6. The fuel is introduced through inlet aperture 7. 8 is the injection nozzle and the cap with the injection apertures is indicated by 9.

In the inoperative position, nozzle needle 4 shuts off the nozzle aperture. The purpose of the nozzle needle is similar to that of prior art devices. Inlet valve 1 is actuated by a rocker arm or a camshaft and spring, not shown in the drawing.

Inlet valve 1 forms a single unit with injection nozzle 8. Since inlet valve 1 is fitted vertically to the cylinder head, the fuel is also injected vertically so that the fuel is atomised for direct injection into the middle of the combustion space and thus constitutes ideal atomisation.

The essential advantages over prior art devices include the fact that the injection nozzle in the inlet valve is cooled by the inspired outside air. Additional cooling fins or water channels for cooling the injection nozzle are unnecessary, representing considerable progress. It must be pointed out in connection with the fuel feed that more than one feed line may be fitted. The present invention is a real step forward in technical progress and is a true advantage in direct-injection diesel engine construction.

I claim:

1. Apparatus for providing combustion air and atomized fuel to the combustion space of a cylinder head of a diesel engine, comprising:

a poppet valve comprising an enlarged head having a seal, and a stem extending axially from the head and adapted to be periodically axially pushed by a valve-opening device and permitted to close by a valve-closing device, said poppet valve being adapted for openably sealingly closing an air inlet to the combustion space of a cylinder head of a diesel engine;

a fuel supply passageway provided in said poppet valve for introducing fuel to the combustion space, said passageway including:

an inlet into said poppet valve through said stem portion thereof, said inlet being adapted for connection with a pressurized supply of fuel;

an outlet from said poppet valve centrally through said enlarged head; and an axially extending passageway portion connecting said inlet with said outlet;

a nozzle needle longitudinally movably received in said poppet valve in a second axially extending passageway, which is separate from and transversally spaced from said fuel supply passageway except at said outlet;

resilient means biasing said nozzle needle for normally closing said outlet of said fuel supply passageway;

said nozzle needle including surface means responsive to fluid pressure for periodically sliding said nozzle needle against force provided by said resilient means for temporarily opening said outlet of said fuel supply passageway, for introducing fuel into the combustion space for admixture with air introduced between said poppet valve head seal and the air inlet to the combustion space of the cylinder head; and said outlet being provided with a fuel injection nozzle for atomizing fuel issuing therethrough into the combustion space into droplets.

2. The apparatus of claim 1, wherein:
said fuel injection nozzle comprises a cap having a plurality of fuel injection apertures.

3. The apparatus of claim 1, wherein:
said resilient means includes a spring and an adjustment screw adjustably threadedly received in the poppet valve stem and engaged with the spring for varying said force provided by said resilient means.

* * * * *